United States Patent
Freiman et al.

(10) Patent No.: US 12,299,379 B2
(45) Date of Patent: May 13, 2025

(54) ADAPTIVE CONTENT DELIVERY

(71) Applicant: Comcast Cable Communications, LLC, Philadelphia, PA (US)

(72) Inventors: Daniel Freiman, Philadelphia, PA (US); Maurice Gaston, Philadelphia, PA (US); Filipe Araujo, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/345,654

(22) Filed: Jun. 30, 2023

(65) Prior Publication Data
US 2024/0184975 A1 Jun. 6, 2024

Related U.S. Application Data

(63) Continuation of application No. 17/348,358, filed on Jun. 15, 2021, now Pat. No. 11,741,292, which is a
(Continued)

(51) Int. Cl.
*H04N 21/20* (2011.01)
*G06F 40/14* (2020.01)
(Continued)

(52) U.S. Cl.
CPC ......... *G06F 40/14* (2020.01); *H04N 21/2662* (2013.01); *H04N 21/4355* (2013.01);
(Continued)

(58) Field of Classification Search
CPC .............. G06F 40/14; H04N 21/2662; H04N 21/4355; H04N 21/4516; H04N 21/4621; H04N 21/6582
See application file for complete search history.

(56) References Cited

U.S. PATENT DOCUMENTS

| | | |
|---|---|---|
| 7,747,782 B2 | 6/2010 | Hunt et al. |
| 8,751,677 B2 | 6/2014 | Li et al. |

(Continued)

FOREIGN PATENT DOCUMENTS

CN 101635673 A * 1/2010 ......... H04L 12/5695

OTHER PUBLICATIONS

Anonymous, "Text of ISO/IEC PDTR 23009-3 DASH Implementation Guidelines", 101. MPEG Meeting; Jul. 16, 2012 Jul. 20, 2012; Stockholm; (Motion Picture Expert Group or ISO/IEC JTC1/SC29/VVG11), No. N12891, Oct. 15, 2012 (Oct. 15, 2012), XP030019363.
(Continued)

*Primary Examiner* — Laurie A Ries
(74) *Attorney, Agent, or Firm* — Ballard Spahr LLP

(57) ABSTRACT

Methods and systems for providing and managing content are disclosed. An example method can comprise receiving at least a portion of a content item and determining a timing attribute associated with at least a portion of the content item. An example method can also comprise determining a delivery information attribute based on the timing attribute. The delivery information attribute can comprise at least one of a time duration to process at least a portion of the content item and a time duration to receive or transmit at least a portion of the content item. An example method can also comprise receiving an update to the content item based on the delivery information attribute.

26 Claims, 9 Drawing Sheets

Related U.S. Application Data continuation of application No. 14/328,334, filed on Jul. 10, 2014, now Pat. No. 11,074,394.

(60) Provisional application No. 61/844,693, filed on Jul. 10, 2013.

(51) Int. Cl.
*H04N 21/2662* (2011.01)
*H04N 21/435* (2011.01)
*H04N 21/45* (2011.01)
*H04N 21/462* (2011.01)
*H04N 21/658* (2011.01)

(52) U.S. Cl.
CPC ..... *H04N 21/4516* (2013.01); *H04N 21/4621* (2013.01); *H04N 21/6582* (2013.01)

(56) References Cited

U.S. PATENT DOCUMENTS

| | | | | |
|---|---|---|---|---|
| 8,782,267 | B2* | 7/2014 | Gilson | H04N 21/6106 709/203 |
| 8,978,076 | B2* | 3/2015 | Gilson | H04N 21/47202 725/89 |
| 9,066,116 | B2 | 6/2015 | Kennedy et al. | |
| 9,286,214 | B2* | 3/2016 | Stifter, Jr. | H04N 21/242 |
| 9,363,540 | B2* | 6/2016 | Rosenfeld | H04N 21/4345 |
| 9,503,540 | B2 | 11/2016 | Athas et al. | |
| 9,832,497 | B2* | 11/2017 | Stokking | H04N 21/8547 |
| 10,063,938 | B2 | 8/2018 | Laurent et al. | |
| 10,880,593 | B2 | 12/2020 | Gilson | |
| 2003/0126608 | A1* | 7/2003 | Safadi | H04N 21/8173 725/111 |
| 2006/0143678 | A1 | 6/2006 | Chou et al. | |
| 2008/0027967 | A1 | 1/2008 | Garbow et al. | |
| 2008/0189360 | A1 | 8/2008 | Kiley et al. | |
| 2009/0210654 | A1 | 8/2009 | Koul et al. | |
| 2010/0257571 | A1 | 10/2010 | Hashimoto et al. | |
| 2011/0054878 | A1 | 3/2011 | Zhang et al. | |
| 2011/0145246 | A1 | 6/2011 | Prager et al. | |
| 2011/0161951 | A1 | 6/2011 | Anderson et al. | |
| 2011/0185209 | A1 | 7/2011 | Shimotono | |
| 2013/0104161 | A1 | 4/2013 | Rouse et al. | |
| 2013/0268964 | A1* | 10/2013 | Nugent | H04N 21/472 725/86 |
| 2014/0115724 | A1 | 4/2014 | van Brandenburg et al. | |
| 2014/0143823 | A1 | 5/2014 | Manchester et al. | |
| 2014/0157345 | A1 | 6/2014 | Garg et al. | |
| 2014/0359070 | A1 | 12/2014 | Sundaram et al. | |
| 2014/0365794 | A1 | 12/2014 | Decker et al. | |
| 2014/0372843 | A1 | 12/2014 | Cameron | |
| 2015/0052571 | A1* | 2/2015 | Stokking | H04N 21/8547 725/116 |

OTHER PUBLICATIONS

Cheng B. H. C. et al., "Composing Adaptive Software", Computer, IEEE, US, vol. 37, No. 7, Jul. 1, 2004 (Jul. 1, 2004), pp. 56-64, XP011115157, ISSN: 0018-9162, DOI 10.1109/MC.2004.48.

Context, Objectives, Use Cases and Requirements for Green MPEG, 104. MPEG Meeting; Apr. 22, 2013-Apr. 26, 2013; Incheon; (Motion Picture Expert Group or ISO/IEC JTC1/SC29/VVG11), No. N13468, Apr. 29, 2013 (Apr. 29, 2013), XP030020218.

"How to detect internet speed in Javascript?", Stack Overflow, Apr. 3, 2011. http://stackoverflow.com/questions/5529718/how-to-detect-internet-speed-in-javascript.

MacVittie, L., "Automatically detecting client speed," F5, Sep. 29, 2009. https://devcentral.f5.com/articles/automatically-detecting-client-speed.

"Thread: Detect user connection speed," Web Developer Forum, Sep. 2, 2005. http://www.webdeveloper.com/forum/showthread.php?77891-Detect-user-connection-speed.

Yiting Liao et al., "Enhancing Video Quality Management in MPEG Dash", 102. MPEG Meeting; Oct. 15, 2012 Oct. 19, 2012; Shanghai; (Motion Picture Expert Group or ISO/IEC JTC1/SC29/VVG11), No. m26892, Oct. 10, 2012 ;Oct. 10, 2012), XP030055225.

Zhan Ma et al., "Energy-efficient Video Processing on Mobile Devices with Embedded Content Information", 100. MPEG Meeting; Apr. 30, 2012-Apr. 5, 2012; Geneva; (Motion Picture Expert Group or ISO/IEC JTC1/SC29/WG11), No. n24982, Apr. 25, 2012 (Apr. 25, 2012), XP030053325.

* cited by examiner

ADAPTIVE CONTENT DELIVERY

CROSS REFERENCE TO RELATED PATENT APPLICATION

This application is a continuation of U.S. application Ser. No. 17/348,358 filed Jun. 15, 2021, which is a continuation of U.S. application Ser. No. 14/328,334 filed Jul. 10, 2014, now U.S. Pat. No. 11,074,394 issued Jul. 27, 2021, which claims priority to U.S. Provisional Application No. 61/844,693 filed Jul. 10, 2013, all of which are herein incorporated by reference in their entireties.

BACKGROUND

Devices with different processing power and network bandwidth often request the same content. The processing power and network bandwidth dedicated to particular content can fluctuate over time for a given device. Thus, there is a need for more sophisticated methods and systems for providing customized content based on processing power, network bandwidth, and other factors.

SUMMARY

It is to be understood that both the following general description and the following detailed description are exemplary and explanatory only and are not restrictive, as claimed. Provided are methods and systems for managing and providing content. An example method can comprise receiving at least a portion of a content item and determining a timing attribute associated with at least a portion of the content item. A delivery information attribute can be determined based on the timing attribute. The delivery information attribute can comprise at least one of a time duration to process at least a portion of the content item and a time duration to receive at least a portion the content item. An update (e.g., additional content that can be integrated with, added to, and/or combined with the at least a portion of the content item) to the content item can be received based on the delivery information attribute.

In another aspect, an example method can comprise identifying timing information associated with first content and determining delivery information attribute based on the timing information. The delivery information attribute can comprise at least one of a time duration to process (e.g., at a device, such as a user device) the first content and a time duration to receive the first content. Second content can be selected based on the delivery information attribute.

In another aspect, an example method can comprise providing at least a portion of a content item and receiving a delivery information attribute based on a timing attribute. The delivery information attribute can comprise at least one of a time duration to process at least a portion of the content item and a time duration to deliver at least a portion of the content item. An update to the content item can be provided based on the delivery information attribute.

In another aspect, an example method can comprise determining a power attribute associated with a device. A power usage profile can be determined based on the power attribute and a content item received at the device can be updated based on the power usage profile.

In another aspect, an example method can comprise receiving power information for a device, selecting content based on the power information, and providing the content to the device.

In another aspect, an example method can comprise receiving at least a portion of a content item, determining power information, and updating the content item based on the power information.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
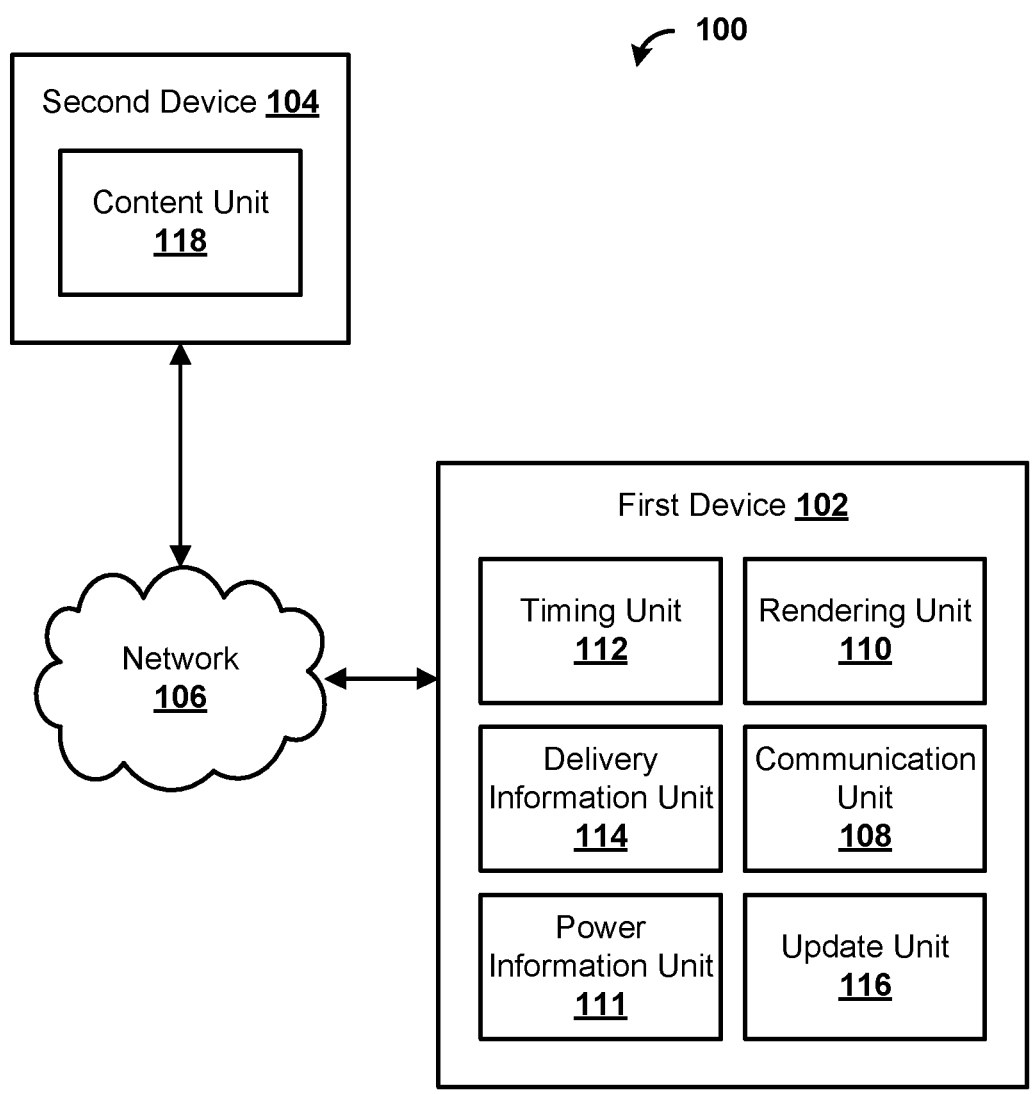
FIG. 1 is a block diagram illustrating various aspects of an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for providing content. Content can be provided to a user through an application, such as a web browser. The content can comprise scripts and other code configured to identify timing attributes. Timing attributes can comprise, for example, time values for a variety of events that occur in the process of connecting to a content server, requesting content, receiving content, processing content, and the like. Delivery information (e.g., one or more delivery information attributes) can be calculated based on the timing attributes. For example, the time values can be compared by subtraction or other mathematical operation. The delivery information can be compared to threshold values to determine how to provide, update, and/or customize content. For example, the delivery information can be used to estimate and/or determine processing speed, network bandwidth, latency, and other factors of content delivery. Depending on the comparison of the delivery information to the threshold values, content can be updated with additional content, options associated the content can be enabled or disabled, content format can be customized, and the like.

In another aspect, the content can comprise scripts and other computer readable code configured to determine power information. For example, power information can comprise power usage modes (e.g., low power, normal power, high power usage). The power information can be associated with a device receiving the content. For example, the content can identify power information based on an attribute of a document object model. Computer readable code in the content can identify content based on the power information. For example, portions of the content can be enabled or disabled based on the power information. As another example, additional content can be requested from a remote device. In some scenarios the power information can be provided to a remote device, such as content server. For example, the power information can be provided in the header of a HyperText Transfer Protocol message. In one aspect, the remote device can select content based on the power information and provide the selected content to the device. As an illustration, content can be associated with various power usage profiles and selected based on such association.

FIG. 1 is a block diagram illustrating an example system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an exemplary embodiment, the methods and systems disclosed can be implemented with one or more of a first device 102 and/or a second device 104. For example, the methods and systems disclosed can be implemented in whole or in part with one or more of the timing unit 112, delivery information unit 114, update unit 116, content unit 118, and other aspects of the system 100 or other computing devices and networks.

In one aspect, the system 100 can comprise a first device 102. In another aspect, the system 100 can comprise a second device 104. The first device 102 can be communicatively coupled to the second device 104 through a network 106. The first device 102 and second device 104 can be implemented as computing devices. For example, the first device 102 can comprise a user device. By way of example, the first device 102 can comprise a set top box, television, digital streaming device, mobile device, laptop device, tablet device, computing station, and the like. As another example, the second device 104 can comprise a content device. The content device can be configured as a content server, such as a web page server, file server, data server, and the like.

In one aspect, the network 106 can comprise a packet switched network, a non-packet switched network (e.g., quadrature amplitude modulation based network), and/or the like. The network 106 can comprise network adapters, switches, routers, and the like connected through wireless links (e.g., radio frequency, satellite) and/or physical links (e.g., fiber optic cable, coaxial cable, Ethernet cable). In one aspect, the network 106 can be configured to provide communication from telephones, cellular devices, modems, and/or other electronic devices to and throughout the system 100.

In one aspect, the first device 102 can comprise a communication unit 108 configured to receive content. For example, the communication unit 108 can be configured to receive text, audio, video, files, interactive content, and the like. For example, the communication unit 108 can receive content as web page. A web page can comprise text, images, audio, video, interactive elements, embedded applications, computer readable code (e.g., markup language, scripting language), a combination thereof, and the like. As an illustration, the communication unit 108 can receive text and computer readable code in hypertext markup language (HTML), JavaScript, ActionScript, Cascading Style Sheets, and/or the like. The communication unit 108 can be configured to receive static or dynamic content. For example, static content can be content such as text, images, and the like configured to persist while a content page is accessed. Dynamic content can comprise interactive elements, moving elements, changing elements, and the like. For example, dynamic content can comprise content configured to be modified, changed, moved, and/or interacted with according to machine readable code (e.g., JavaScript, ActionScript, ASP, and the like). In one aspect, the communication unit 108 can be configured to request content from a content device, such as a hypertext transfer protocol based (HTTP) server. For example, the communication unit 108 can be configured to enter into a communication session with the second device 104. During the communication session, the first device 102 can request one or more files and/or data fragments from the second device 104, and the second device 104 can provide (e.g., transmit via the network 106) the requested files and/or data fragments to the first device 102. The communication unit 108 can be configured to enter into a HTTP session with the second device 104 to receive content from the second device 104.

In one aspect, the first device 102 can comprise a rendering unit 110 configured to process and otherwise render the content for communication to and/or interaction with a user. For example, the rendering unit 110 can process the content and provide the content through a user interface. In one aspect, the user interface can comprise an application window, web browser window, and/or the like. For example, the rendering unit 110 can process computer readable code in the content. The rendering unit 110 can process the computer readable code to provide interactive elements, such as buttons, moveable window elements, interactive text, moving images, customized content, updated content, and other dynamic or static content. For example, the rendering unit 110 can comprise a web browser or other content rendering application.

In one aspect, the first device 102 can comprise a power information unit 111. The power information unit 111 can be configured to determine (e.g., measure, collect, receive) power information related to the first device 102. In one aspect, power information can comprise a percentage of power used by the first device 102, a remaining amount of power in a first device 102, a power capacity of the first device 102, a power allocated to the first device 102 (e.g., or a specific application thereof), a power consumption rate of the first device 102, and/or the like. In one aspect, the power information can comprise information related to a power mode (e.g., power usage mode) of the first device 102. For example, a power mode can be associated with one or more applications. For example, the power mode can be a setting in a web browser, content viewer, and/or the like. In another aspect, a power mode can be a setting implemented by an operating system or other low level functionality of the first device 102.

In one aspect, a power mode can specify power usage levels on a spectrum from low power usage (e.g., sleep mode, light-usage mode) to high power usage. As an illustration, a power mode can comprise at least one of a power save mode, a normal power mode, a performance mode, and the like. The power save mode can indicate that the first device 102 and/or an application running thereon (e.g., the rendering unit 110) is configured to use less power than standard settings. For example, power save mode can indicate a preference and/or configuration setting for the application to use as little power as possible while maintaining a minimum threshold of operation. As another example, power save mode can indicate a preference and/or configuration setting for the application to use less than a threshold amount of power during a time period.

In one aspect, a normal power mode can indicate that the first device 102 and/or an application running thereon (e.g., the rendering unit 110) is configured to use a standard amount of power. For example, the normal power mode can indicate a preference and/or configuration setting for the rendering unit 110 to provide a standard web experience.

In one aspect, a performance power mode can indicate that the first device 102 and/or an application running thereon (e.g., the rendering unit 110) is configured for performance (e.g., processing) at a higher level (e.g., 60%, 70%, 80%, 90% or more of processing power) than the normal power mode and/or for a longer time (e.g., process content for 1.5, 2, or 3 times the amount of time as normal power mode) than the normal power mode. For example, the performance power mode can indicate a preference and/or configuration setting for the rendering unit 110 to provide the best available user experience (e.g., additional graphics, transitions, higher definition content) regardless of how much power might be consumed.

In one aspect, power modes can be defined according to one or more other power grades on a spectrum of grades. For example, power modes can be indicated by numerical values (e.g., power modes numbered in the range of 1-3, 1-5, 1-10, 1-100, 1-1000, and the like). Higher numerical values in the range of numerical values can indicate that the device is in a power mode allowing a higher amount of power usage. Higher numerical values can also indicate that a user prefers usage of higher amounts of power, if necessary, to provide richer, more power consuming, content.

In one aspect, the power information unit 111 can determine the power information based on an application add-on, an application extension, an application programing interface (API), and/or other application feature. For example, the power information can be stored as an attribute accessible by a computer executable code in the content (e.g., JavaScript or other client side script). In one aspect, the power information can be stored in an attribute of a document object model. For example, the first device 102 (e.g., via the rendering unit 110 or an application implemented thereon) can be configured to insert the power information into one or more attributes of a document object model. For example, the first device 102 can be configured to maintain user power information settings, such as a preferred power mode. When an application is loaded and/or initialized by the rendering unit 110, the application can insert the power information into a document object model managed by the application. For example, the application can be configured to generate and/or set one or more attribute in the document object model. In one aspect, the document object model can be associated with and/or representative of a specific content item, such as a web page. As an illustration, the document object model can comprise an attribute as follows: browser.powerMode=["power save" | "normal" | "performance"], where the brackets indicate example values of the browser.powerMode attribute.

As an illustration, the first device 102 can receive content from the second device 104. The first device 102 can process the content. For example, the content can comprise computer readable code (e.g., client side script language). The first device 102 can execute the computer readable code. In one aspect, the content can request the power information from the first device 102. For example, the content can access an attribute (e.g., browser.privateMode) in the document object model. The content can comprise one or more modules configured to determine and/or perform one or more operations based on the power information. For example, the modules can specify additional content updates to request from one or more other devices, such as the second device 104. The modules can disable and/or enable one or more other modules within the content. For example, operations using an amount of power and/or a processor power above a threshold can be enabled or disabled. Operations using an amount of power and/or a processor power below a threshold can be enabled or disabled. In one aspect, a module can provide the power information to the second device 104. The second device 104 can perform one or more operations based on the power information. For example, the second device 104 can be configured to determine (e.g., based on the power information) content to provide to the first device 102. For example, if a power save mode is determined, the second device 104 can provide less content, provide content without one or more elements, provide lower resolution content, update content, and/or the like.

In one aspect, the first device 102 can provide the power information to one or more other devices. For example, the communication unit 108 can be configured to provide the power information to the second device 104. In one aspect, the power information can be provided to the second device 104 through an electronic message from the first device 102. For example, the first device 102 can provide the power information in a HyperText Transfer Protocol (HTTP) message. The power information can be provided in a header of the HTTP message. As a further example, the power information can be provided in a field of the HTTP header, such as a power mode field. As an example, an HTTP header can comprise the following: "Power Mode: ['power save' | 'normal' | 'performance']", where the brackets indicate example values of the Power Mode field. As a further illustration, the first device 102 can be in a communication session with the second device 104. For example, the first device 102 can establish an HTTP communication session with the second device 104. During the communication session, the first device 102 can provide the power information in a header of a message (e.g., server call) to the second device 104. In one aspect, the first device 102 can comprise a timing unit 112 configured to determine timing information associated with the content. In one aspect, the timing information can comprise one or more timing attributes associated with the content. For example, the timing attributes can comprise time values associated with a variety of events related to the content. In one aspect, the timing attributes can comprise time values associated with events occurring in the delivery of, receiving of, processing of, and interacting with content. As an illustration, example time values can be associated with generating and/or providing a request for content, receiving a request for content, generating and/or providing a request to connect to a device (e.g., first device 102, second device 104), receiving a request to connect a device (e.g., first device 102, second device 104), a completion of initializing a connection with the second device 104, a receiving of the content (e.g., receipt of a specified byte of content, such as the last byte), transmitting of the content, a start of processing the content, an end of processing content, a start of processing (e.g., determining, generating, parsing, accessing) a document object model associated with the content, an end of processing a document object model associated with the content, a start of displaying content, a completion of displaying (e.g., when the content is fully rendered in an initial state), receiving one or more interactions from a user, and the like. In one aspect, the timing values can be measured from the first device 102 and/or the second device 104.

In one aspect, the timing attributes can be attributes related to (e.g., associated with) power information. For example, power information can comprise an amount of power usage (e.g., over a time period, during a processing), a percentage of power used, and/or a remaining amount of electrical power. For example, a timing attribute can comprise a power level, a power capacity, a power consumption mode (e.g., sleep mode, low power mode, medium power mode, high power mode), and the like, determined (e.g., measured, detected) at one or more times. As an illustration, timing attributes can comprise power information associated with a first time and power information associated with a second time.

In one aspect, the timing attributes can be attributes related to user interaction with an application or interface element thereof. For example, an interaction of a user can be detected by the triggering of one or more event handlers, functions, subroutines, and other functionality. For example, a timing attribute can comprise time values associated with a click, button press, scroll, mouse movement, and the like. In another aspect, timing attributes can be attributes related to rendering or otherwise providing access (e.g., to view, interact with) to content. For example, a timing attribute can comprise a time corresponding to a paint start event. The paint start event can occur when the application (e.g., web browser) displays a specified pixel, such as the first pixel to be displayed. In another aspect, the paint start event can occur when a specified number of pixels are provided (e.g., rendered) on a display (e.g., computer monitor). As another example, a timing attribute can comprise a time associated with a paint viewport complete event. The paint viewport complete event can occur when all the pixels of a viewport (e.g., portion of a window and/or display immediately viewable by a user) are provided (e.g., painted, rendered) on the viewport.

In one aspect, the timing attributes can be attributes determined by an application add-on, application extension, application programing interface (API), and/or other application feature. An example API can comprise a Navigation Timing API. For example, the Navigation Timing API is described in detail at http://www.w3.org/TR/navigation-timing/the entirety of which is hereby incorporated by reference. In one aspect, the Navigation Timing API can be implemented on an application configured to process HTML and other scripting languages. For example, the Navigation Timing API can be implemented in a web browser. The Navigation Timing API can comprise a Performance Timing Interface. As an illustration, timing attributes can comprise attributes of the Performance Timing Interface. As an illustration, a computer readable code (e.g., scripting language) can access an attribute in the Performance Timing Interface of a web browser by reading a value stored at 'performance.timing. <attribute>', where <attribute> is a field that can comprise a variety of timing attributes. For example, timing attributes can comprise one or more of the following attributes of the Performance Timing Interface: navigationStart, unloadEventStart, unloadEventEnd, redirectStart, redirectEnd, fetchStart, domainLookupStart, domainLookupEnd, connectStart, connectEnd, secureConnectionStart, requestStart, responseStart, responseEnd, domLoading, domInteractive, domContentLoadedEventStart, domContentLoadedEventEnd, domComplete, loadEventStart, loadEventEnd, and the like.

In another aspect, other APIs, add-ons, and/or extensions can be utilized to detect additional timing attributes. For example, the paint start event and/or paint viewport complete event can be implemented as an extension or updated implementation of the Navigation Timing API. As an illustration, the paint viewport complete attributes can be implemented through the User Timing API. The User Timing API is described at https://dvcs.w3.org/hg/webperf/raw-file/tip/specs/UserTiming/Overview.html the entirety of which is hereby incorporated by reference. For example, the paint viewport complete attribute can be based on the mark_above_the_fold attribute of the User Timing API. As another example, timing attributes can comprise power attributes indicating power consumption modes, power levels, power capacity at one or more times, and the like. As another example, timing attributes can comprise times associated with user interactions (e.g., first user interaction with website, such as clicking a mouse, moving a mouse, scrolling a page, typing), reference events (e.g., paint start event, paint complete event, user interaction event), and the like. As an illustration, a time associated with a user interaction can be based on the mark_time_to_user_action attribute of the User Timing API. In one aspect, the application can access power consumption modes, current power levels, and other attributes (e.g., variables and other function calls) native to an operating system running on the first device 102. Then, the application can provide access to these timing attributes. In another aspect, timing attributes can be detected by executable code (e.g., functions, variables, calls), implemented in computer code received by the application, or implemented in the application itself.

As another illustration, timing attributes can be attributes determined by a mobile device, such as a tablet device, smart phone, smart watch, smart glasses, or other portable electronic device. For example, the mobile device can comprise an application, such as a social media application, electronic reader, organizer, media consumption interface, and the like. The application can be configured to determine the timing attributes through embedded code, APIs, extensions, and/or the like.

In one aspect, the first device 102 can comprise a delivery information unit 114 configured to determine delivery information, such as one or more delivery information attributes. The delivery information can be determined based on timing information. For example, the delivery information can be determined based on one or more timing attributes. For example, the delivery information can comprise a time duration to process the content, a time duration to receive the content, a time duration to connect to a content server (e.g., second device 104), a time duration to use a portion of power, a time duration to receive a compressed file and/or process a compressed file, and the like. In another aspect, delivery information can be based on power attributes of a device (e.g. first device 102). For example, a power attribute can indicate a power consumption mode, a power level, a time duration to use an amount of power, a power capacity, and the like.

In one aspect, the delivery information unit 114 can be configured to determine delivery information by performing one or more calculations based on timing attributes. For example, various mathematical operations (e.g., subtraction, addition, multiplication, division, less than, greater than, and the like) can be performed on the timing attributes to determine and/or estimate delivery information. As an example, a first timing attribute comprising a first time can be subtracted from a second timing attribute comprising a second time (e.g., a time subsequent to the first time). In one aspect, the time difference between the first time and the second time can be determined as delivery information. For example, delivery information can comprise the result of subtracting the first time from the second time.

As a first illustration, the delivery information unit 114 can determine as delivery information a time duration to process the content. For example, the first timing attribute can comprise a time associated with beginning to process the content. The second timing attribute can comprise a time associated with completion of processing the content. As an illustration, the first timing attribute can comprise a time associated with beginning to process a document object model. The second timing attribute can comprise a time associated with completion of processing the document object model. For example, after receiving content, the rendering unit 110 can process (e.g., parse, read) the content for markup language, scripting language, style sheets, images, video, audio, text, and the like. Based on this processing, the rendering unit 110 can generate a document object model. For example, the document object model can comprise various objects and variables to facilitate manipulation and access to the constituent elements of the content. Accordingly, the time duration to process the content can be determined by subtracting or otherwise determining the time difference between the time associated with beginning to process the content (e.g., first timing attribute) and the time associated with completing content processing (e.g., second timing attribute). As a further example, the first timing attribute can comprise the domLoading attribute of the Performance Timing Interface. The second timing attribute can comprise the domComplete attribute of the Performance Timing Interface.

As a second illustration, the delivery information unit 114 can determine as delivery information a time duration to establish a network connection (e.g., HTTP session) with a content server. For example, the first timing attribute can comprise a time associated with initiating a network connection with the second device 104. The second timing attribute can comprise a time associated with completing the network connection with the second device 104. Accordingly, the time duration to establish a network connection can be determined by subtracting or otherwise determining the time difference between the time associated with initiating a network connection (e.g., first timing attribute) and the time associated with completing the network connection (e.g., second timing attribute). As a further example, the first timing attribute can comprise the connectStart attribute of the Performance Timing Interface. The second timing attribute can comprise the connectEnd attribute of the Performance Timing Interface. In such case, the delivery information can be determined by subtracting the connectStart attribute from the connectEnd attribute. In another aspect, similar APIs that provide the same and/or similar function calls can be implemented to detect similar timing attributes depending the specific application used on the second device 104.

As a third illustration, the delivery information unit 114 can determine as delivery information a time duration to transmit and/or receive the content. For example, the first timing attribute can comprise a time associated with beginning to transmit and/or receive content. The second timing attribute can comprise a time associated with completing transmission and/or receipt of content. The time duration to transmit and/or receive the content can be determined by subtracting or otherwise determining the time difference between the time associated with beginning to transmit and/or receive the content (e.g., first timing attribute) from the time associated with completing to transmit and/or receive content (e.g., second timing attribute). As a further example, the first timing attribute can comprise the requestStart or responseStart attribute of the Performance Timing Interface. The second timing attribute can comprise the responseEnd attribute of the Performance Timing Interface. In such case, the delivery information can be determined by subtracting or otherwise determining a time difference between the responseEnd attribute and the requestStart or responseStart attribute.

As a fourth illustration, the delivery information unit 114 can determine as delivery information a time duration between a user interaction with an application on the first device 102 (e.g., interaction with the user interface) and a reference event. For example, the first timing attributes can comprise a time associated with a first interaction of a user with an application on the first device 102. As another example, the first timing attribute can comprise a reference time, such as when the application is done loading data or any of the attributes of the Navigation Timing API. As a further example, the first timing attribute can comprise a time corresponding to a paint start event. As another example, the first timing attribute can comprise a time associated with a paint viewport complete event.

The second timing attribute can comprise a time associated with a first interaction or additional interaction of a user with an application on the first device 102. An interaction of the user can be detected by the triggering of one or more event handlers, functions, subroutines, and other functionality. For example, the second timing attribute can comprise a time associated with a click, button press, scroll, mouse movement, and the like. When such an event occurs, the application can be configured to trigger the execution of one or more functions. For example, when the event occurs a time stamp can be recorded and associated with the second timing attribute.

As a fifth illustration, the delivery information unit 114 can determine as delivery information a power usage of a device (e.g., of the first device 102 or the second device 104) during a time duration. For example, the first timing attribute can comprise a first power level detected at a first time. The second timing attribute can comprise a second power level determined at a second time. During the time between the first time and second time, the device can process content. For example, the first time can be associated with beginning to process content or a content update. The second time can be associated with completion of processing content or a content update. In one aspect, the first power level and/or the second power level can be detected at the same or similar time as one or more timing attributes associated with the Navigation Timing API. For example, the first power level can be measured at a time associated with beginning to load a document object model. The second current power level can be measured at a time associated with completion of loading a document object model. The delivery information can be determined by subtracting (e.g., or otherwise comparing) the first power level from the second power level.

As another example, the delivery information unit 114 can determine as delivery information a power consumption mode of a device (e.g., the first device 102 or the second device 104). The power consumption mode can comprise, for example, a low power mode, a medium power mode, a high power mode, or any number of power modes on a scale (e.g., range, continuum) from no power consumption to the maximum power consumption of a device. The power consumption mode can vary according to user preference and usage by a user of the device. For example, during regular usage of a device, the device can operate in a high power mode and/or a medium power mode. If the user has not used a device for a period of time, the device can enter a low power mode (e.g., light-usage mode) or a sleep mode to conserve energy.

In one aspect, the delivery information unit 114 can determine delivery information based a combination of various types of other delivery information. For example, the delivery information can comprise a combination of processing time, content delivery time, connection time, and the like. For example, the delivery information can comprise a combination of a time duration to process the content, a time duration to establish a network connection, a time duration to transmit and/or receive the content, and the like.

In one aspect, the first device 102 can comprise an update unit 116. The update unit 116 can request content updates and/or additional content based on the delivery information and/or timing information. For example, the update unit 116 can request content updates and/or additional content through a request to the second device 104. In one aspect, the request can be provided to the second device 106 through an XMLHttpRequest object, or other functionality such as GET, POST, HEAD, CONNECT, and the like HTTP functions. As another example, the request can be provided through any available data transfer mechanism.

In one aspect, the update unit 116 can compare the delivery information to one or more threshold values. For example, the update unit 116 can update the content if the delivery information is above, below, and/or equal to the threshold values. In one aspect, the delivery information can be compared to multiple thresholds (e.g., thresholds with different weights or relative importance in determining if an update is appropriate). In one aspect, updating the content can comprise enabling or disabling at least a portion of a script (e.g., a dynamic element, component of an application or content rendered on the application), replacing a script and/or functional element with a different script and/or functional element, changing a configuration option related to processing and/or delivering content, receiving an update to content, receiving additional content, and the like. For example, video and/or audio content can be replaced with the same video and/or audio content at a different resolution, data size, aspect ratio, bit rate, and/or the like. As another example, the content item can comprise a link to additional content. The link can be replaced with a link to different additional content (e.g., at a different resolution, size).

In one aspect, the update unit 116 can update the content if the time duration to process the content is above or below a threshold value. As an example, if the time duration to process the content is above a threshold value, then portions of the content can be disabled. As an example, dynamic elements of the content can be disabled, such as movements of elements in the content, video, high resolution content, and other processor intensive elements. If the time duration to process the content is below a threshold value, portions of the content can be enabled, such as dynamic elements, video, high resolution content, and/or other processor intensive elements.

As an example, the update unit 116 can update the content if a time duration to transmit and/or receive the content is above or below a threshold value. For example, if the time duration to transmit and/or receive the content is below a threshold value, then the update unit 116 can request updates to the content. This scenario can indicate that network bandwidth is available to transfer additional and/or updated content without interruption to the user. If the time duration to transmit and/or receive the content is above the threshold value, then the update unit 116 can proceed without requesting updates to the content. Alternatively, the update unit 116 can request updates to the content of a smaller size than the updates requested if the time duration to send and/or receive the content is below the threshold value. For example, content can be requested with a lower resolution, fewer colors, and the like.

As an example, the update unit 116 can update the content if a time duration to establish a network connection is above or below a threshold value. For example, if the time duration to establish the network connection is below the threshold value, then the update unit 116 can request additional updates to the content. If the time duration to establish the network connection is above the threshold value, the update unit 116 can proceed without requesting additional updates.

In one aspect, the update unit 116 can update the content if a power level is above or below a threshold value. For example, if the power level is above a threshold value, the update unit 116 can request additional updates to the content and/or enable dynamic content. If the current power level is below the threshold value, the update unit 116 can proceed without requesting additional updates. In another aspect, the update unit 116 can update the content based on a power consumption mode. For example, if the power consumption mode is a high power mode and/or a medium power mode, the update unit 116 can request additional updates. If the power consumption mode is a low power mode and/or a medium power mode, then the update unit 116 can proceed without requesting additional updates. If a power usage of a device during a time duration is below a threshold value, the update unit 116 can request additional updates. If the power usage value is above the threshold value, then the update unit 116 can proceed without requesting additional updates.

Additionally, the update unit 116 can perform one or more predictive calculations to determine if additional updates would cause the device to fall below a specified power value. For example, if providing an update could cause the first device 102 to fall below a specified power level, then the update unit 116 can proceed without requesting additional updates.

In one aspect, the update unit 116 can request additional updates based on a change in power information. For example, the application can update the power information based on a change to a power mode by the device, application, and/or user. For example, if the first device 102 transitions from a normal power mode to a power save mode (e.g., because the device's battery falls below a threshold, or based on a user changing the mode), the document object model can be modified. For example, if the first device 102 changes from a normal mode to a power save mode, the value of browser.powerMode can be changed from "normal" to "power save." In one aspect, the document object model can be modified by computer executable code in the content or in the application. For example, the document object model can be modified based on an event listener. The event listener can be configured to identify an event related to power information, such as when the power mode changes.

In another aspect, the update unit 116 can request updates based on a change in the document object model. The change in the document object model can be indicative of a change in power information. For example, an event listener can be triggered by a document object model (DOM) change event. In one aspect, the event listener can be associated with a function or module configured to perform one or more operations when an event is detected, such as a change to the document object model. In one aspect, the event listener can be associated with a change in the power information. For example, the first device 102 can be configured to update the power information in the document object module. As another example, the event can be identified by an event listener specific to the power information. For example, the update unit 116 can be configured to identify when the power information is modified and allow one or more operations to be associated with such event. As a further illustration, the update unit 116 can request additional updates based on a change in a browser.powerMode attribute of a document object model. In another aspect, the update unit 116 can be configured to provide updated power information to the second device 104.

In an aspect, the update unit 116 can update the content based on a time duration between user interactions and/or a time duration between a reference event and a user interaction. For example, if a time duration between user interactions and/or a time duration between a reference event and a user interaction is above or below a threshold value, then the update unit 116 can request additional updates or proceed without requesting additional updates.

In one aspect, the update unit 116 can be configured to update a configuration option related to the content. The configuration option can comprise an option to enable or disable a portion of the content. For example, elements of the content can be disabled or enabled based on the time duration to process the content. As a further illustration, moving elements, dynamic elements, interactive elements, video elements, and the like can be disabled if the time duration to process the content is above a threshold value. The configuration option can comprise an option to request and/or receive content according to a specified transmission mode. For example, if the time duration to establish a network connection is above a first threshold and the time duration to receive content is below a second threshold, the update unit 116 can select a transmission mode in which content is received in one large batch rather than a transmission mode employing several batches.

In another aspect, the configuration option can comprise a compression profile option. For example, the compression profile can specify a type of compression (e.g., codecs used), level of compression (e.g., how much space is saved), quality of compression (e.g., amount of data loss), complexity of compression (e.g., processing required to compress or decompress), and/or other compression options. The compression profile can be associated with one or more data types, such as audio, text, video, and the like. As an example, the update unit 116 can update the compression profile option to specify that a user device requests a lower quality video than a default quality of video. As a further example, the update unit 116 can request additional content according to the options specified in the compression profile.

In one aspect, the compression profile can be selected based on a time duration to process content, a time duration to transmit and/or receive content, a power attribute of a device, and/or the like. For example, a device with a lower power level than a threshold value can be associated with a compression profile specifying lower compression complexity and/or compression quality than default values. As another example, if the device is associated with a longer time duration to receive and/or provide content than threshold values, then the device can be associated with a compression profile having a higher complexity and/or compression quality than a default value. In one aspect, a combination of a length of time to receive (e.g., or provide) content, a time duration to process content, and/or a power attribute can be used to determine an optimal compression profile. For example, a device with high bandwidth but low processing capacity (e.g., or low power), can be associated with a compression profile specifying a high level of compression but a lower level of compression complexity than default or threshold values.

In one aspect, one or more elements and/or the functionality thereof of the first device 102 can be implemented as part of an application, such as a web browser or other user interface configured to communicate through a network. For example, elements of the first device 102 can comprise the communication unit 108, rendering unit 110, timing unit 112, delivery information unit 114, update unit 116, and the like. In one aspect, the elements of the first device 102 can be implemented with computer readable code (e.g., client side and/or server side scripting language) configured to interact with the application. For example some of the elements of the first device 102 can be implemented as computer readable code received in the content and run by an application on the first device 102. Other elements of the first device 102 can be implemented by the application without additional computer readable code.

In one aspect, the second device 104 can comprise a content unit 118. The content unit 118 can be configured to provide content to the first device 102. For example, the content unit 118 can receive requests for content from the first device 102. For example, the second device 104 can comprise a server configured to provide content. As an illustration, the second device 104 can comprise an HTTP server, file transfer protocol (FTP) server, streaming content server, and the like.

In one aspect, the first device 102 can specify the requested content. For example, the first device 102 can provide an identifier such as a uniform resource identifier. In one aspect, the uniform resource identifier (URI) can comprise a uniform resource locator (URL). For example, the URL can identify content on the second device 104. In another aspect, the first device 102 can provide a more general request for content meeting specified criteria. For example, the first device 102 can provide the timing information, power information, and/or the like. The second device 104 can receive the timing information determined by the timing unit 112 of the first device 102. In one aspect, the delivery information unit 114 of the first device 102 can be implemented on the second device 104. For example, the second device 104 can receive the timing information, and the delivery information unit implemented on the second device 104 can determine delivery information as described in further detail herein (e.g., in the same or similar manner as the delivery information unit 114 of the first device 102). For example, the content unit 118 can determine a time duration to transmit and/or receive the content, a time duration to establish a network connection, a time duration to process the content as delivery information, and/or the like. As an illustration, the content unit 118 can determine a processing time, a content delivery time, a connection time, a combination thereof, and/or the like.

In one aspect, the content unit 118 can select content based on the delivery information and/or power information. For example, the update unit 116 of the first device 102 can be implemented on the second device 104. The update unit implemented on the second device 104 can select content based on the delivery information and/or power information as described in more detail herein (e.g., in the same or similar manner as the update unit 116 of the first device 102). For example, the content unit 118 can compare the delivery information and/or power information to one or more threshold values. Based on such comparison, the content unit 118 can identify and/or select content for the first device 102. The content unit 118 can provide the updated content and/or addition content to the first device 102.

Figure 2:
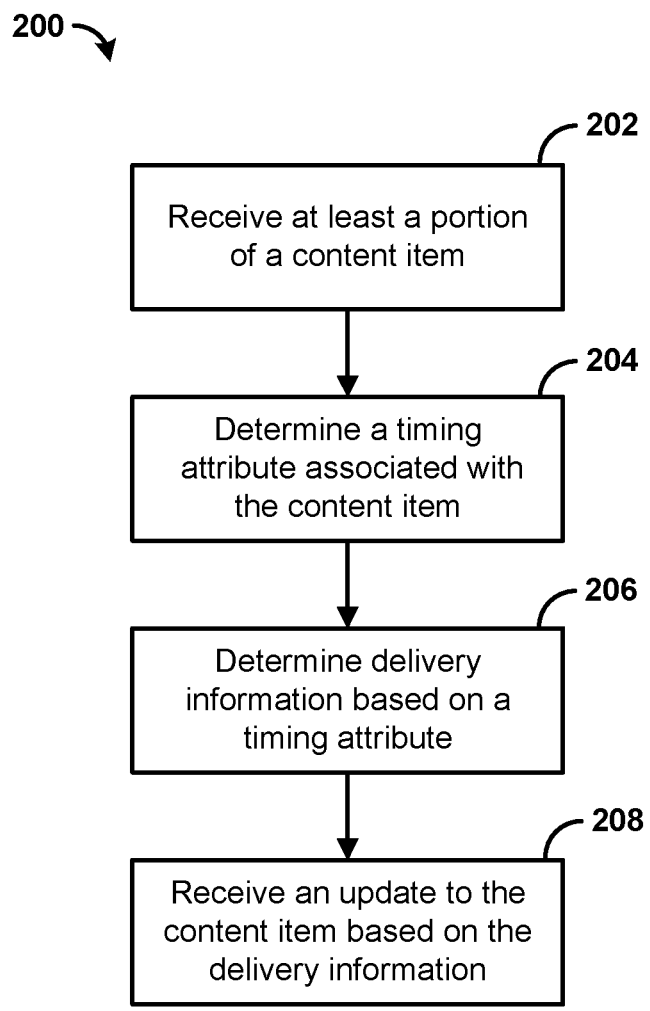
FIG. 2 is a flowchart illustrating an example method for providing content.

FIG. 2 is a flowchart illustrating an example method 200 for providing content. In step 202, at least a portion of a content item can be received. For example, the content item can comprise at least a portion of a web page, electronic document, image, video, audio, data fragment, and/or the like.

In step 204, a timing attribute associated with at least a portion of the content item can be determined. In one aspect, the timing attribute can comprise a time associated with an event that occurs at a device (e.g., user device) in receiving at least a portion of the content item, processing at least a portion of the content item, or the like. In one aspect, determining the timing attribute can comprise determining an attribute associated with at least a portion of the content item and/or the device. The attribute associated with the content item can be stored by a user interface on the device. For example, the attribute associated with at least a portion of the content item can be stored by a web interface on the device. As an illustration, the attribute can comprise an object, a variable, or other storage element. For example, the attribute can be stored on the device as part of a document object model associated with at least a portion of the content item.

In another aspect of step 204, a first timing attribute and a second timing attribute can be determined. As an example, the first timing attribute can comprise a time associated with a request. The second timing attribute can comprise a time associated with a response. The time associated with the request can be a time associated with a request for at least a portion of the content item. The response can comprise a response from a device having at least a portion of the content item (e.g., content server). As an example, the time associated with the response can be a time associated with receiving all or a portion of the content item. As a further illustration, the first timing attribute can comprise a requestStart attribute of the Performance Timing Interface of the Navigation Timing API. The second timing attribute can comprise a responseStart or responseEnd attribute of the Performance Timing Interface of the Navigation Timing API.

As another example, the first timing attribute can comprise a time associated with initiating a network connection with a device. The second timing attribute can comprise a time associated with completing the network connection with the device. For example, the first timing attribute can comprise a time associated with a request for a communication session based on one or more communication protocols (e.g., transmission control protocol, hypertext transfer protocol). The second timing attribute can comprise a time associated with completing the initialization process of establishing the communication session. As a further illustration, the first timing attribute can comprise a connectStart attribute of the Performance Timing Interface of the Navigation Timing API. The second timing attribute can comprise a connectEnd attribute of the Performance Timing Interface of the Navigation Timing API.

As a further example, the first timing attribute can comprise a time associated with beginning (e.g., by a device receiving the content item) to process (e.g., parse, generate, read, access) a document object model based on at least a portion of the content item. For example, a document object model can be generated based on at least a portion of the content item (e.g., parsing the content item). The second timing attribute can comprise a time associated with completing processing (e.g., by a device receiving the content item) the document object model based on at least a portion of the content item. For example, the document object model can comprise various objects and variables to facilitate manipulation and access (e.g., through scripting languages, such as JavaScript) to the constituent elements of the content item. As a further illustration, the first timing attribute can comprise a domLoading attribute of the Performance Timing Interface of the Navigation Timing API. The second timing attribute can comprise a domComplete attribute of the Performance Timing Interface of the Navigation Timing API.

As a further example, the first timing attribute can comprise a time associated with a reference event related to at least a portion of the content item. In another aspect, the reference event can comprise any event in the receiving, loading, processing, providing of at least a portion of the content item, or an interaction of a user with at least a portion of the content item. The second timing attribute can comprise a time associated with a user interaction at the device. As a further example, the first timing attribute can comprise a power attribute associated with a first time. The second timing attribute can comprise a power attribute associated with a second time. In one aspect, a power attribute can indicate at least one of a power consumption mode, a power level, a time duration to use an amount of power, and a power capacity. In another aspect, the power attribute can comprise power information as described herein.

In step 206, delivery information (e.g., a delivery information attribute) can be determined based on a timing attribute. In one aspect, delivery information (e.g., the delivery information attribute) can comprise at least one of a time duration to process at least a portion of the content item, a time duration to receive at least a portion of the content item, a time duration to establish a network connection with a device receiving at least a portion of the content item, a power attribute, a time duration between a reference event and a user interaction, and the like. In another aspect, determining delivery information (e.g., the delivery information attribute) can comprise determining a difference between the first timing attribute and the second timing attribute. For example, delivery information (e.g., the delivery information attribute) can comprise a time duration associated with processing at least a portion of the content item, a time duration associated with establishing a network connection, a time duration associated with transmitting and/or receiving at least a portion of the content, and the like.

In step 208, an update to the content item can be received based on the delivery information (e.g., the delivery information attribute). In one aspect, the update can be customized to a current state of a device receiving at least a portion of the content item based on the delivery information (e.g., the delivery information attribute). For example, the state of the device receiving and/or providing at least a portion of the content item can fluctuate over time resulting in a measurement of different delivery information (e.g., the delivery information attribute) at different times. As an illustration, the network bandwidth and/or the processing speed of the device receiving and/or providing at least a portion of the content item can vary. In one aspect, the update can be selected based on a threshold value. For example, at least a portion of the content item can be updated if the delivery information (e.g., the delivery information attribute) is above, below, and/or equal to one or more threshold values. In one aspect, updating the content item can comprise enabling or disabling at least a portion of a script (e.g., a dynamic element), changing a configuration option related to processing and/or delivering at least a portion of content, receiving an update to at least a portion of content, receiving additional content, and/or the like. As an illustration, at least a portion of the content item can be updated if the time duration to process the content is above, below, and/or equal to a threshold value. As another illustration, at least a portion of the content item can be updated if a time duration to transmit and/or receive at least a portion of the content is above, below, and/or equal to a threshold value. As a further illustration, at least a portion of the content item can be updated if a time duration to establish a network connection is above, below, and/or equal to a threshold value. As another illustration, at least a portion of the content item can be updated if a time duration between a reference event and a user interaction is above, below, or equal to a threshold value. As yet another illustration, the content item can be updated if a power attribute is above, below, and/or equal to a threshold value.

Figure 3:
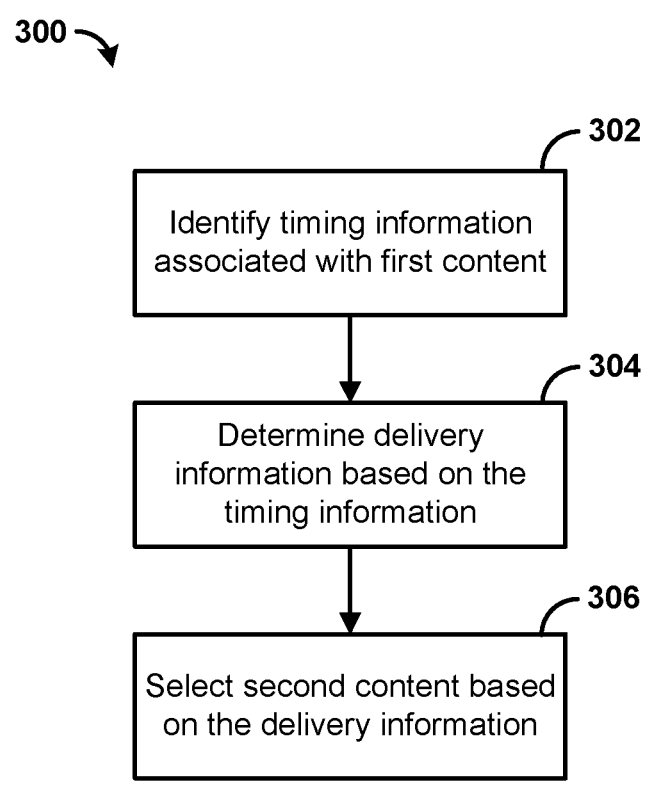
FIG. 3 is a flowchart illustrating another example method for providing content.

FIG. 3 is a flowchart illustrating another example method 300 for providing content. In step 302, timing information associated with first content can be identified. For example, the first content can comprise at least a portion of a web page, electronic document, image, video, audio, data fragment, and/or the like. In one aspect, the timing information can be identified at a device receiving the first content. The device receiving the first content can provide the timing information to a device providing the first content. In another aspect, the timing information can be identified by a device providing the first content.

In one aspect, the timing information can comprise a time associated with an event that occurs at a device in at least one of transmitting (e.g., measured by time provided and/or received) the first content and processing the first content. For example, an attribute associated with the first content can be determined. The attribute associated with the first content can be stored by a web interface on a device receiving the first content. As an illustration, the attribute can comprise an object, a variable, or other storage element. For example, the attribute can be stored on the device receiving the first content as part of a document object model associated with the first content. The attribute associated with the first content can be stored by a user interface on the device. In another aspect, the attribute can be stored on a device providing the first content.

In one aspect, a first timing attribute and a second timing attribute can be determined. As an example, the first timing attribute can comprise a time associated with a request and the second timing attribute can comprise a time associated with a response. The time associated with the request can be a time associated with a request for the first content. The response can comprise a response from a device having the first content (e.g., content server). As an example, the time associated with the response can be a time associated with receiving all or a portion of the first content. As a further illustration, the first timing attribute can comprise a request-Start attribute of the Performance Timing Interface of the Navigation Timing API. The second timing attribute can comprise a responseStart or responseEnd attribute of the Performance Timing Interface of the Navigation Timing API. As another illustration, the request can comprise a time value associated with receiving a request at a device providing the first content. The response can comprise a time value associated with completing providing the first content at the device providing the first content.

As another example, the first timing attribute can comprise a time associated with initiating a network connection with a device, and the second timing attribute can comprise a time associated with completing the network connection with the device. For example, the first timing attribute can comprise a time associated with a request for a communication session based on one or more communication protocols (e.g., transmission control protocol, hypertext transfer protocol). The second timing attribute can comprise a time associated with completing the initialization process of establishing the communication session. As a further illustration, the first timing attribute can comprise a connectStart attribute of the Performance Timing Interface of the Navigation Timing API. The second timing attribute can comprise a connectEnd attribute of the Performance Timing Interface of the Navigation Timing API. As another illustration, the first timing attribute can comprise a time at which a device providing the first content receives a request to initialize a communication session. The second timing attribute can comprise a time at which the device providing the first content completes initialization of a communication session with a device requesting the first content. For example, after initialization of the communication session, content can be transmitted through the communication session.

As a further example, the first timing attribute can comprise a time associated with beginning (e.g., by a device receiving the content item) to process (e.g., parse, generate, read, access) a document object model based on the first content. For example, the document object model can be generated based on the first content (e.g., parsing the first content). The second timing attribute can comprise a time associated with completing processing the document object model based on the first content. For example, the document object model can comprise various objects and variables to facilitate manipulation and access (e.g., through scripting languages, such as JavaScript) to the constituent elements of the first content. As a further illustration, the first timing attribute can comprise a domLoading attribute of the Performance Timing Interface of the Navigation Timing API. The second timing attribute can comprise a domComplete attribute of the Performance Timing Interface of the Navigation Timing API.

As a further example, the first timing attribute can comprise a time associated with a reference event related to the first content. In another aspect, the reference event can comprise any event in the receiving, loading, processing, providing of the content item, or an interaction of a user with the first content. The second timing attribute can comprise a time associated with a user interaction at the device. As a further example, the first timing attribute can comprise a power attribute associated with a first time. The second timing attribute can comprise a power attribute associated with a second time. In one aspect, a power attribute can indicate at least one of a power consumption mode, a power level, a time duration to use an amount of power, and a power capacity. In another aspect, the power attribute can comprise power information as described herein.

In step 304, delivery information (e.g., a delivery information attribute) can be determined based on the timing information. The delivery information (e.g., the delivery information attribute) can comprise at least one of a time duration to process the first content, a time duration to receive the first content, a time duration to establish a network connection with a device receiving the first content, a power attribute, a time duration between a reference event and a user interaction, and the like. Determining the delivery information (e.g., the delivery information attribute) can comprise determining a difference between the first timing attribute and the second timing attribute. For example, delivery information (e.g., the delivery information attribute) can comprise a time duration associated with processing the first content, a time duration associated with establishing a network connection, a time duration associated with transmitting and/or receiving the content, and the like.

In step 306, second content can be selected based on the delivery information (e.g., the delivery information attribute). The second content can comprise an update to the first content, content at a different resolution and/or bit rate than the first content, additional or supplemental content to be combined and/or integrated with the first content, and/or the like. In one aspect, the second content can be selected based on a threshold value. In one aspect, the second content can be customized to a current state of a device receiving the first content based on the delivery information (e.g., the delivery information attribute). For example, the state of the device receiving and/or providing the first content can fluctuate over time resulting in a measurement of different delivery information (e.g., the delivery information attribute) at different times. As an illustration, the network bandwidth and/or the processing speed of the device receiving and/or providing the first content can vary. For example, the second content can be selected based on whether the delivery information (e.g., the delivery information attribute) is above, below, and/or equal to one or more threshold values. In one aspect, selecting the second content can comprise selectively enabling or disabling at least a portion of a script (e.g., a dynamic element), selecting a configuration option associated with the content related to processing and/or delivering content, selecting an update to content, selecting additional content, and/or the like. As an illustration, the second content can be selected if the time duration to process the content is above, below, and/or equal to a threshold value. As another illustration, the second content can be selected if a time duration to transmit and/or receive the content is above, below, and/or equal to a threshold value. As a further illustration, the second content can be selected if a time duration to establish a network connection is above, below, and/or equal to a threshold value. As another illustration, the second content can be selected if a time duration between a reference event and a user interaction is above, below, or equal to a threshold value. As yet another illustration, the second content can be updated if a power attribute is above, below, and/or equal to a threshold value.

Figure 4:
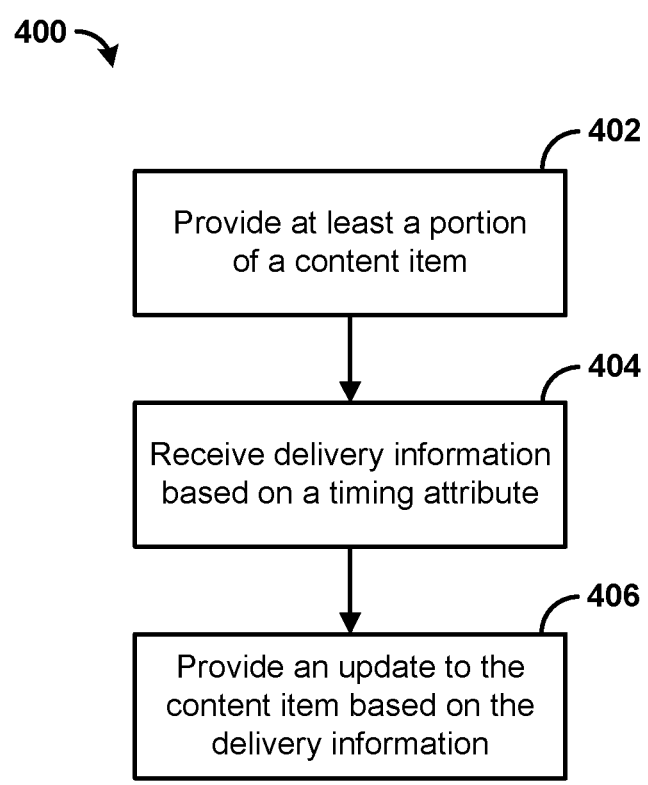
FIG. 4 is a flowchart illustrating yet another example method for providing content.

FIG. 4 is a flowchart illustrating yet another example method 400 for providing content. In step 402, at least a portion of a content item can be provided. For example, at least a portion of the content item can comprise at least a portion of a web page, electronic document, image, video, audio, data fragment, and/or the like.

In step 404, delivery information (e.g., a delivery information attribute) based on a timing attribute can be received. In one aspect, the timing attribute can comprise an attribute associated with at least a portion of the content item. The attribute associated with at least a portion of the content item can be stored by a web interface on a device receiving at least a portion of the content item. As an illustration, the attribute can comprise an object, a variable, or other storage element. For example, the attribute can be stored on a device receiving at least a portion of the content item as part of a document object model associated with at least a portion of the content item. The attribute associated with at least a portion of the content item can be stored by a user interface on the device. In another aspect, the attribute can be stored on a device providing at least a portion of the content item. For example, the attribute can be provided to the device providing at least a portion of the content item.

In one aspect, the delivery information (e.g., the delivery information attribute) can comprise at least one of a time duration to process at least a portion of the content item, a time duration to deliver at least a portion of the content item, a time duration to establish a network connection with a device receiving at least a portion of the content item, a power attribute, a time duration between a reference event and a user interaction, and the like. In one aspect, a power attribute can indicate at least one of a power consumption mode, a power level, a time duration to use an amount of power, and a power capacity. In another aspect, the power attribute can comprise power information as described herein. In another aspect, the reference event can comprise any event in the receiving, loading, processing, providing of at least a portion of the content item, or an interaction of a user with at least a portion of the content item. In one aspect, the timing attribute can comprise a time associated with an event that occurs at a device in at least one of receiving at least a portion of the content item and processing at least a portion of the content item.

In one aspect, receiving delivery information (e.g., the delivery information attribute) based on a timing attribute can comprise receiving delivery information (e.g., the delivery information attribute) based on a first timing attribute and a second timing attribute. The delivery information (e.g., the delivery information attribute) can comprise a difference between the first timing attribute and the second timing attribute. For example, the first timing attribute can comprise a time associated with a request, and the second timing attribute can comprise a time associated with a response. The time associated with the request can be a time associated with a request for at least a portion of the content item. The response can comprise a response from a device having at least a portion of the content item (e.g., content server). As an example, the time associated with the response can be a time associated with receiving all or a portion of the content item. As a further illustration, the first timing attribute can comprise a requestStart attribute of the Performance Timing Interface of the Navigation Timing API. The second timing attribute can comprise a responseStart or responseEnd attribute of the Performance Timing Interface of the Navigation Timing API.

As another illustration, the request can comprise a time value associated with receiving a request for the first content at a device providing the first content. The response can comprise a time value associated with a completion of providing the first content measured at the device providing the first content.

As another example, the first timing attribute can comprise a time associated with initiating a network connection with a device. The second timing attribute can comprise a time associated with completing the network connection with the device. For example, the first timing attribute can comprise a time associated with a request for a communication session based on one or more communication protocols (e.g., transmission control protocol, hypertext transfer protocol). The second timing attribute can comprise a time associated with completing the initialization process of establishing the communication session. As a further illustration, the first timing attribute can comprise a connectStart attribute of the Performance Timing Interface of the Navigation Timing API. The second timing attribute can comprise a connectEnd attribute of the Performance Timing Interface of the Navigation Timing API.

As a further example, the first timing attribute can comprise a time associated with beginning (e.g., by a device receiving the content item) to process (e.g., parse, generate, read, access) a document object model based on at least a portion of the content item. For example, the document object model can be generated based on at least a portion of the content item (e.g., parsing the content item). The second timing attribute can comprise a time associated with completing processing the document object model based on at least a portion of the content item. For example, the document object model can comprise various objects and variables to facilitate manipulation and access (e.g., through scripting languages, such as JavaScript) to the constituent elements of at least a portion of the content item. As a further illustration, the first timing attribute can comprise the domLoading attribute of the Performance Timing Interface of the Navigation Timing API. The second timing attribute can comprise the domComplete attribute of the Performance Timing Interface of the Navigation Timing API.

As a further example, the first timing attribute can comprise a time associated with a reference event related to at least a portion of the content item. In another aspect, the reference event can comprise any event in the receiving, loading, processing, providing of at least a portion of the content item or an interaction of a user with at least a portion of the content item. The second timing attribute can comprise a time associated with a user interaction at the device. As a further example, the first timing attribute can comprise a power attribute associated with a first time. The second timing attribute can comprise a power attribute associated with a second time. In one aspect, a power attribute can indicate at least one of a power consumption mode, a power level, a time duration to use an amount of power, and a power capacity.

In step 406, an update to the content item based on the delivery information (e.g., the delivery information attribute) can be provided. In one aspect, the update can be customized to a current state of a device receiving the content item based on the delivery information (e.g., the delivery information attribute). For example, the state of the device receiving and/or providing at least a portion of the content item can fluctuate over time resulting in a measurement of different delivery information (e.g., the delivery information attribute) at different times. As an illustration, the network bandwidth and/or the processing speed of the device receiving and/or providing at least a portion of the content item can vary.

In one aspect, the update can be selected based on a threshold value. For example, the content item can be updated if the delivery information (e.g., the delivery information attribute) is above, below, and/or equal to one or more threshold values. In one aspect, updating the content item can comprise enabling or disabling at least a portion of a script (e.g., a dynamic element), changing a configuration option related to processing and/or delivering content, replacing content, hiding or showing content, receiving additional content, and/or the like. As an illustration, the content item can be updated if the time duration to process the content is above, below, and/or equal to a threshold value. As another illustration, the content item can be updated if a time duration to transmit and/or receive the content is above, below, and/or equal to a threshold value. As a further illustration, the content item can be updated if a time duration to establish a network connection is above, below, and/or equal to a threshold value. As another illustration, the content item can be updated if a time duration between a reference event and a user interaction is above, below, or equal to a threshold value. As yet another illustration, the content item can be updated if a power attribute is above, below, and/or equal to a threshold value.

Figure 5:
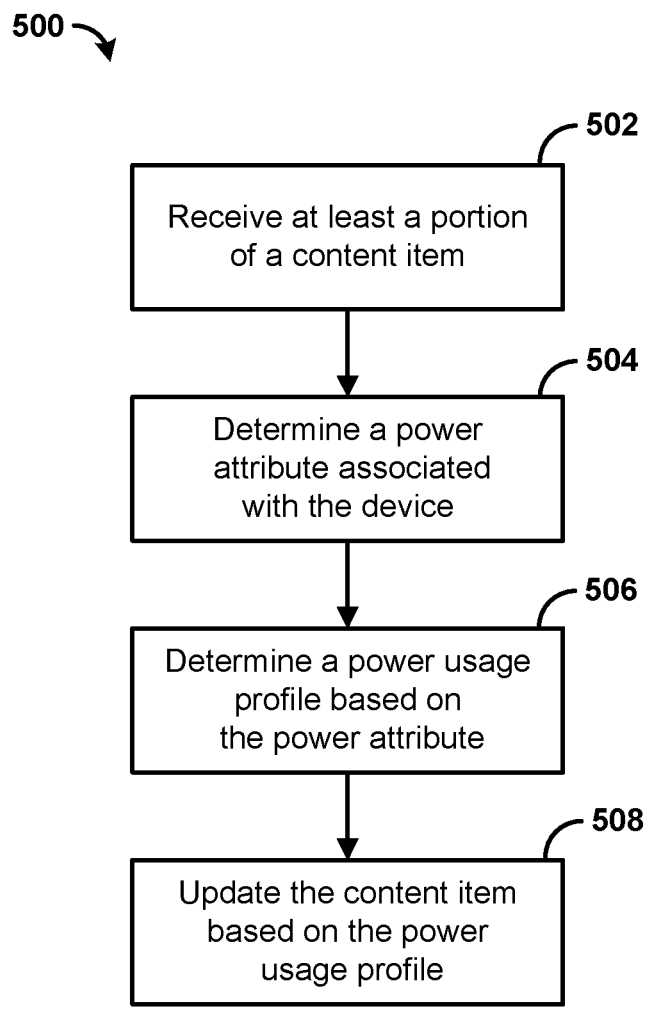
FIG. 5 is a flowchart illustrating yet another example method for providing content.

FIG. 5 is a flowchart illustrating yet another method 500 for providing content. In step 502, at least a portion of a content item can be received at a device. In one aspect, the content item can comprise a web page, content associated with web page, and the like. In step 504, a power attribute associated with a device can be determined. The power attribute can comprise at least one of a power level, power capacity, and a power usage mode. In one aspect, the power attribute can comprise power information as described herein. In one aspect, the power attribute can be determined at the device. For example, the at least a portion of the content item can comprise a computer readable code (e.g., in a scripting language such as JavaScript) configured to determine the power attribute based on a call to a function, variable, or other coding element.

In step 506, a power usage profile can be determined based on the power attribute. For example, the power usage profile can be determined by comparing the power attribute to a threshold value. As another example, the power usage profile can be a number (e.g., calculated or measured value related to or based on the power attribute) or a step on a scale (e.g., high, medium, low). In step 508, the content item can be updated based on the power usage profile. For example, an update to the content item can be selected such that the device conforms to the power usage profile while processing the updated content item. As a further example, selecting the update to the content item such that the device conforms to the power usage profile while processing the updated content item can comprise selecting a content compression profile for the content.

Figure 6:
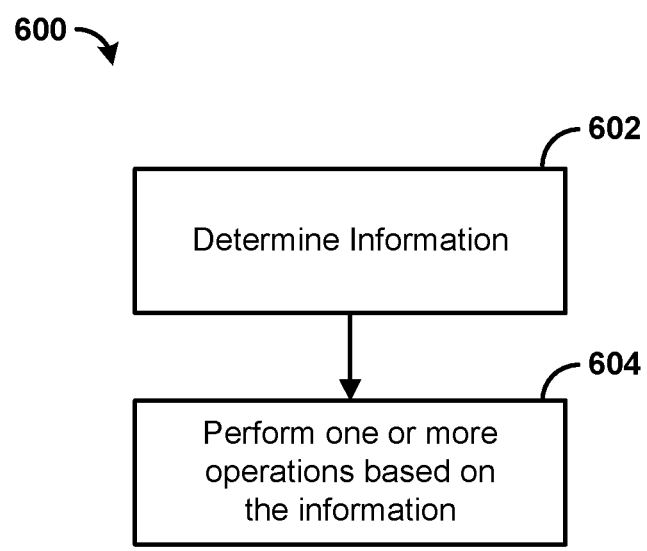
FIG. 6 is a flowchart illustrating yet another example method for providing content.

FIG. 6 shows a flowchart illustrating an example method 600 for providing content. At step 602, information can be determined. Information can comprise, for example, user information (e.g., user preferences), device type, device power information, device user, device capabilities (e.g., processing speed, memory), user history, device history, geographic information, service provider information, network information, and/or the like. The information can be determined by a client-side computer readable code, a server-side computer readable code, a computer readable code at one or more intermediary network devices (e.g., router, gateway, set top box, modem, termination system), and/or the like. For example, the information can be determined based on one or more data points (e.g., timing information, power information, user information). One or more calculations can be performed based on the information and/or data points. For example, data points can be added, subtracted, integrated, applied to one or more formulas, and/or the like.

At step 604, one or more operations can be performed based on the information. For example, an operation can comprise updating content. As an illustration, the information can be determined by content received at a first device. Upon instruction from the content, the first device can perform an update to the content or otherwise modify one or more options associated with consumption of the content. As another illustration, the first device can provide the information (e.g., based on instruction from the content) to a second device (e.g., the device providing the content). The second device can determine an update and/or modification to the content. The second device can communicate the update and/or modification to the content to the first device. For example, an update and/or modification can comprise any other update as described herein.

Figure 7:
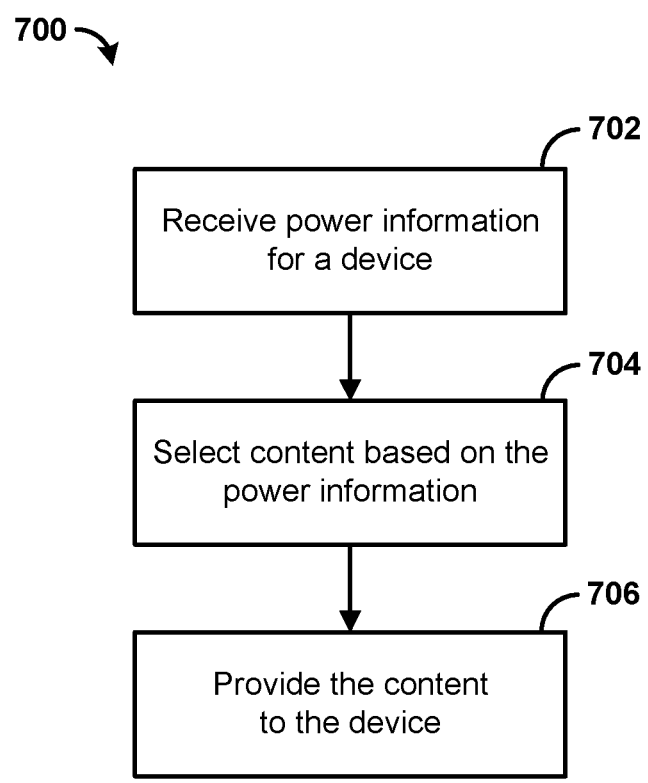
FIG. 7 is a flowchart illustrating yet another example method for providing content.

FIG. 7 is a flowchart illustrating an example method 700 for providing content. At step 702, power information can be received for a device. In one aspect, power information can comprise a percentage of power used by the device, a remaining amount of power in the device, a power capacity of the device, a power allocated to the device (e.g., or a specific application thereof), a power consumption rate of the device, a power usage of the device and/or the like. In one aspect, a power usage mode associated with the device can be received. For example, the power information can comprise one or more power usage modes. The power usage modes can comprise a power usage mode associated with one or more applications. In another aspect, the power usage modes can comprise a power usage mode of the device. For example, the power usage mode can be implemented by an operating system or other low-level functionality of a device. For example, power usage modes can specify power usage levels on a spectrum from low power usage (e.g., sleep mode, light-usage mode) to high power usage. As an illustration, the power information can comprise at least one of a power save mode, a normal power mode, a performance mode, and the like. The power save mode can indicate that the device is configured and/or a user prefers content configured to use less power than normal. For example, a power save mode can indicate that a device (e.g., application on the device) is configured and/or a user prefers to use as little power as possible while maintaining a minimum threshold of operation. A normal power mode can indicate that the device (e.g., application on the device) is configured and/or a user prefers content configured to use a standard amount of power. For example, normal mode can be an instruction to provide a standard web experience. A performance mode can indicate that the device (e.g., application on the device)

is configured and/or a user prefers content configured to perform (e.g., process) at a higher level (e.g., 60%, 70%, 80%, 90% or more of processing power) than the normal power mode and/or for a longer time (e.g., process content for 1.5, 2, or 3 times the amount of time as normal power mode) than the normal power mode. For example, the performance mode can configure and/or instruct a device to provide the best user experience (e.g., additional graphics, transitions, higher definition) regardless of how much power might be consumed. As another illustration, power modes can comprise a low power mode, a medium power mode, and a high power mode. As another illustration, example power modes can be indicated by a numerical value (e.g., power modes numbered 1 through 10 or 1 through 100). For example, higher numerical values can indicate that the device is in a power mode allowing a higher amount of power. Higher numerical values can also indicate that a user prefers the device to use higher amounts of power, if necessary, for richer content.

In one aspect, the power information can be received from a device. For example, the power information can be received by a remote device, such as a server. As an illustration, the device can provide the power information to a content server. The remote device can be configured to perform one or more operations or modify the implementation of an operation based on the power information. In one aspect, the power information can be received at a remote device through an electronic message from the device. For example, the power information can be received in a HyperText Transfer Protocol (HTTP) message. For example, the power information can be received in an HTTP header. As a further example, the power information can be received in a field of the HTTP header. As an example, an HTTP header can comprise the following: "Power Mode: ['power save' | 'normal' | 'performance']", where the brackets indicate example values of the Power Mode field. As a further illustration, the device can be in a communication session with the remote device. For example, the device can be in an HTTP communication session with the remote device. During the communication session or otherwise, the device can provide the power information in a header of message (e.g., server call) to the remote device.

In another aspect, the power information can be received by an application operating at the device. For example, the device can receive content from the remote device. The content can comprise one or more functional modules configured to access and/or receive power information. For example, the power information can be stored as an attribute accessible by a computer executable code in the content (e.g., JavaScript or other client side script). In one aspect, the power information can be stored in an attribute of a document object model. For example, the application can be configured to insert the power information into one or more attributes of the document object model. As an illustration, the document object model can comprise example attributes as follows: browser.powerMode=["power save" | "normal" | "performance"], where the brackets indicate example values of the browser.powerMode attribute.

In another aspect, the power information can be received based on a change to a power mode by the device, application, and/or user. For example, if the device transitions from one power mode to another power mode, then the power information can be updated. For example, the power information can be updated in a document object model. In some scenarios, the updated power information can be provided to a remove device. As an illustration, if the device changes from a normal power mode to a power save mode (e.g., because the device's battery falls below a threshold, or based on a user changing the mode), the document object model can be modified. For example, if the device changes from a normal mode to a power save mode, the value of browser.powerMode can be changed from "normal" to "power save." In one aspect, the document object model can be modified by computer executable code in the content or in the application. For example, the document object model can be modified based on an event listener. The event listener can be configured to identify an event related to power information, such as when the power mode changes. Then, the device and/or content received by the device can update the document object model based on the change.

In another aspect, event listeners can be configured to identify changes in the power information based on changes in the document object model (DOM). For example, an event listener can be associated with the DOM change event. In one aspect, the event listener can be associated with a change in the power information reflected in an attribute of the DOM (e.g., browser.powerMode attribute). In one aspect, the event listener can be associated with a function or module configured to perform one or more operations when an event is detected, such as a change to the document object model. In one aspect, the one or more operations can comprise providing updated power information to a remote device.

At step 704, content can be selected based on the power information. For example, a portion of a content item can be selected based on the power usage mode. As another example, a remote device can determine content to provide to the device based on the power information. For example, if the power information comprises a power save mode, the remote device or content on the device can select less content, select content without one or more elements, select lower resolution content (e.g., content at a lower bit rate, lower number of pixels and/or scan lines), select content updates, and/or the like.

As another illustration, the device can receive content from a remote device. An application on the device can process the content. For example, the content can comprise computer readable code (e.g. client-side script language). The application can execute the computer readable code. In one aspect, the content can request the power information from the application. For example, the content can access an attribute (e.g., browser.privateMode) in the document object model. The content can comprise one or more modules configured to determine one or more operations based on the power information. For example, the modules can specify additional content updates to request from the remote device. The modules can disable and/or enable one or more other modules within the content. For example, operations using an amount of power and/or a processor power above a threshold can be enabled or disabled. Operations using an amount of power and/or a processor power below a threshold can be enabled or disabled. In one aspect, a module can provide the power information to the remote device, and the remote device can perform one or more operations based on the power information. For example, the remote device can select content based on the power information.

At step 706, the content can be provided to the device. For example, modules in the content that are enabled can be configured to provide selected content to the user. As another example, the remote device can provide content to the device based on the selected content.

Figure 8:
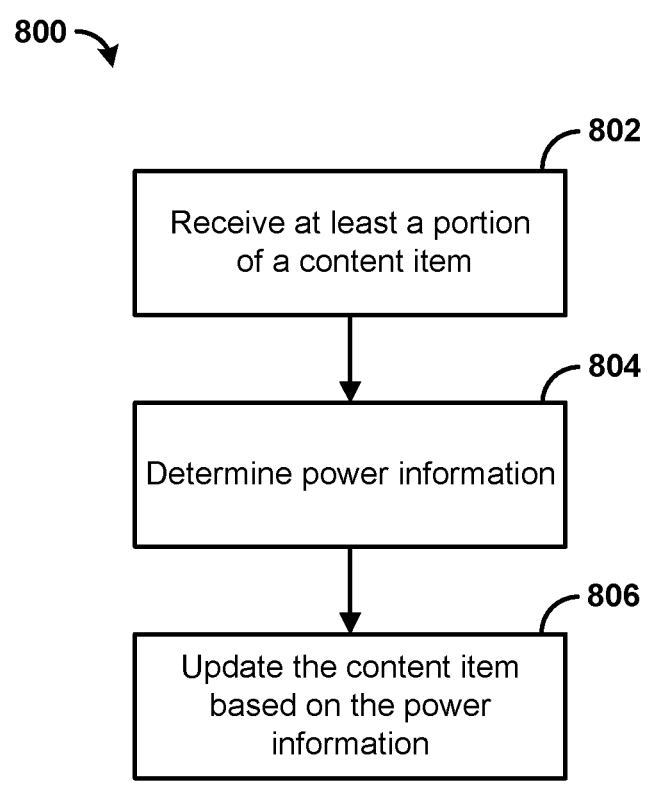
FIG. 8 is a flowchart illustrating yet another example method for providing content.

FIG. 8 is a flowchart illustrating a method 800 for providing content. At step 802, at least a portion of a content item can be received. For example, at least a portion of a web page can be received. In one aspect, the portion of the content item can be received in a communication session, such as a HyperText Transfer Protocol based communication session.

At step 804, power information can be determined. In one aspect, power information can comprise a percentage of power used by a device, a remaining amount of power in the device, a power capacity of the device, a power allocated to the device (e.g., or a specific application thereof), a power consumption rate of the device, and/or the like. In one aspect, the power information can comprise one or more power modes (e.g., power usage mode). The power modes can comprise a power mode associated with a device, user, and/or application. In another aspect, the power modes can comprise a power mode of the device. For example, the power mode can be implemented by an operating system or other low level functionality of a device. For example, power modes can specify power usage levels on a spectrum from low power usage (e.g., sleep mode, light-usage mode) to high power usage. As an illustration, the power information can comprise at least one of a power save mode, a normal power mode, a performance mode, and the like. The power save mode can indicate that the device is configured and/or a user prefers to use less power than normal. For example, power save mode can indicate a preference and/or configuration to use as little power as possible while maintaining a minimum threshold of operation. A normal power mode can indicate that the device is configured and/or a user prefers to use a standard amount of power. For example, normal mode can indicate a preference or configuration to provide a standard web experience. A performance mode can indicate that the device is configured for and/or a user prefers the application to perform (e.g., process) at a higher level (e.g., 60%, 70%, 80%, 90% or more of processing power) than the normal power mode and/or for a longer time (e.g., process content for 1.5, 2, or 3 times the amount of time as normal power mode) than the normal power mode. For example, the performance mode can indicate a preference or configuration to provide the best user experience (e.g., additional graphics, transitions, higher definition) regardless of how much power might be consumed. As another illustration, power modes can comprise a low power mode, a medium power mode, and a high power mode. As another illustration, example power modes can be indicated by a numerical value (e.g., power modes numbered 1 through 10 or 1 through 100). For example, higher numerical values can indicate that the device is in a power mode allowing a higher amount of power. Higher numerical values can also indicate that a user prefers the device to use higher amounts of power, if necessary, for richer content.

In another aspect, the power information can be determined by an application operating on the device receiving the content item. For example, the device can receive content from the remote device, such as a content server. The content can comprise one or more functional modules configured to access and/or receive power information. For example, the power information can be stored as an attribute accessible by a computer executable code in the content (e.g., JavaScript or other client side script). In one aspect, the power information can be stored in an attribute of a document object model. For example, the power information can be determined in an attribute of a document object model associated with the content item. For example, an application (e.g., web browser or other content viewer) can be configured to insert the power information into one or more attributes of a document object model associated with the content item. As an illustration, the document object model can comprise example attributes as follows: browser.powerMode=["power save" | "normal" | "performance"], where the brackets indicate example values of the browser.powerMode attribute.

In another aspect, the power information can be determined based on a change to a power mode by the device, application, and/or user. For example, if the device transitions from one power mode to another power mode, then the power information can be updated. For example, the power information can be updated in a document object model associated with the content item. In some scenarios, the updated power information can be provided to a remove device. As an illustration, if the device changes from a normal power mode to a power save mode (e.g., because the device's battery falls below a threshold, or based on a user changing the mode), the document object model can be modified. For example, if the device changes from a normal mode to a power save mode, the value of browser.powerMode can be changed from "normal" to "power save." In one aspect, the document object model can be modified by computer executable code in the content or by an application configured to provide the content item. For example, the document object model can be modified based on an event listener. The event listener can be configured to identify an event related to power information, such as when the power mode changes. Then, the application and/or content received by the application can update the document object model based on the change.

In another aspect, an event listener can be configured to determine the power information based on a change in the power information. For example, the event listener can be configured to determine a change in the power information based on a change in the document object model (DOM). For example, an event listener can be associated with the DOM change event. In one aspect, the event listener can be associated with a change in the power information reflected in an attribute of the DOM (e.g., browser.powerMode attribute). In one aspect, the event listener can be associated with a function or module configured to perform one or more operations when an event is detected, such as a change to the document object model. In one aspect, the one or more operations can comprise providing updated power information to a remote device.

At step 806, the content item can be updated based on the power information. For example, a portion of the content item can be enabled. As another example, a portion of the content item can be disabled. As another example, additional content can be requested. As a further example, additional portions of content can be received from a remote device. For example, a request for additional content can be provided to the remote device. The power information can be provided to the remote device, and such can be deemed as a request for additional content. The power information can As another illustration, the device can receive a content item from a remote device. An application on the device can process the content item. For example, the content item can comprise computer readable code (e.g. client side script language). The application can execute the computer readable code. In one aspect, the content item can request the power information from the application. For example, the content item can access an attribute (e.g., browser.privateMode) in the document object model. The content item can comprise one or more modules configured to perform one or more operations based on the power information. For example, the modules can specify additional content updates to request from the remote device. The modules can provide portions of the content item. The modules can disable and/or enable one or more other modules within the content. For example, operations using an amount of power and/or a processor power above a threshold can be enabled (e.g., displayed, processed) or disabled (e.g., hidden, skipped). Operations using an amount of power and/or a processor power below a threshold can be enabled or disabled. In one aspect, a module can provide the power information to the remote device, and the remote device can perform one or more operations based on the power information. For example, the remote device can provide an update to the content item based on the power information. As another example, the power information can be provided to the remote device in a hypertext transfer protocol header field (e.g., as part of an HTTP session or otherwise).

Figure 9:
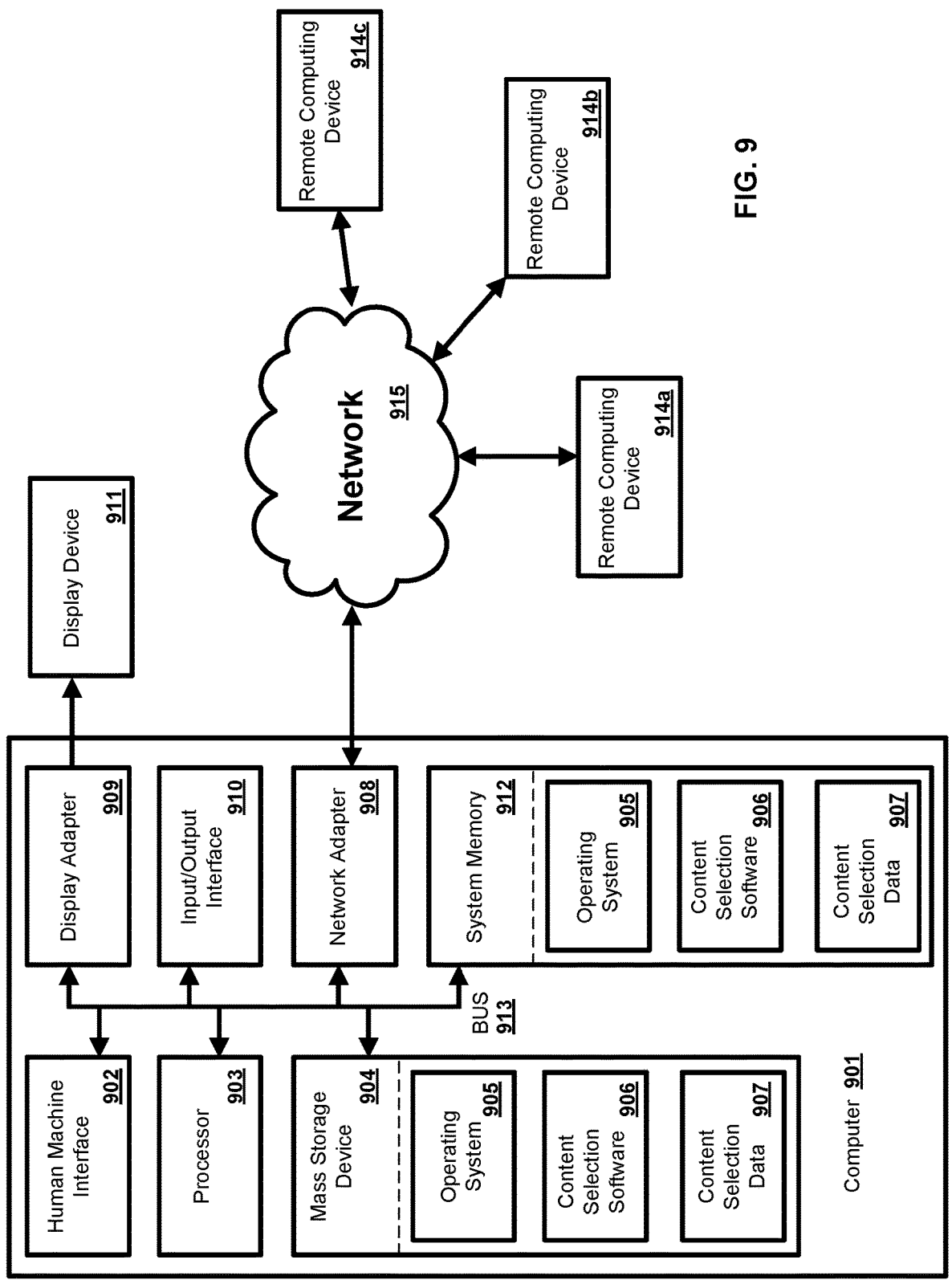
FIG. 9 is a block diagram illustrating an example computing device in which the present systems and methods can operate.

In an exemplary aspect, the methods and systems can be implemented on a computer 901 as illustrated in FIG. 9 and described below. By way of example, the first device 102 and/or the second device 104 of FIG. 1 can be a computer as illustrated in FIG. 9. Similarly, the methods and systems disclosed can utilize one or more computers to perform one or more functions in one or more locations. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors or processing units 903, a system memory 912, and a system bus 913 that couples various system components including the processor 903 to the system memory 912. In the case of multiple processing units 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, content selection software 906, content selection data 907, a network adapter 908, system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as content selection data 907 and/or program modules such as operating system 905 and content selection software 906 that are immediately accessible to and/or are presently operated on by the processing unit 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and content selection software 906. Each of the operating system 905 and content selection software 906 (or some combination thereof) can comprise elements of the programming and the content selection software 906. Content selection data 907 can also be stored on the mass storage device 904. Content selection data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computer 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computing device 901, and are executed by the data processor(s) of the computer. An implementation of content selection software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving timing information associated with content provided to a device;
   determining, based on the timing information, a first timing attribute and a second timing attribute;
   determining, based on a difference between the first timing attribute and the second timing attribute, delivery information;
   determining, based on the delivery information, second content; and
   sending the second content to the device.

2. The method of claim 1, wherein the timing information comprises a time associated with an event that occurs at a device in at least one of:
   receiving the content or processing the content.

3. The method of claim 1, wherein the first timing attribute comprises a time associated with initiating a network connection with the device, and the second timing attribute comprises a time associated with completing the network connection with the device.

4. The method of claim 1, further comprising determining a time duration to establish a network connection for inclusion in the delivery information.

5. The method of claim 1, wherein the second content comprises at least one of: an update to the content, the content at a different resolution than a resolution of the content, the content at different a bit rate than a bit rate of the content, supplemental content to be combined with the content, supplemental content to be integrated with the content, or an advertisement.

6. The method of claim 1, wherein the delivery information comprises at least one of: a time duration to send the content, a time duration to establish a network connection, a time duration between a reference event and a user interaction, or a power attribute.

7. The method of claim 1, wherein the delivery information comprises at least one of a time duration to process the content or a time duration to receive the content.

8. A method comprising:
receiving timing information associated with content;
determining, based on the timing information, delivery information comprising a time duration to process the content;
determining, based on the time duration to process the content satisfying a threshold, second content; and
sending the second content.

9. The method of claim 8, wherein the timing information comprises a time associated with an event that occurs at a device in at least one of:
receiving the content or processing the content.

10. The method of claim 8, further comprising:
determining, based on the timing information, a first timing attribute and a second timing attribute; and
determining the delivery information based on a difference between the first timing attribute and the second timing attribute.

11. The method of claim 10, wherein the first timing attribute comprises a time associated with initiating a network connection with a device, and the second timing attribute comprises a time associated with completing the network connection with the device.

12. The method of claim 8, further comprising determining a time duration to establish a network connection with a device sending the content.

13. The method of claim 8, wherein the second content comprises at least one of: an update to the content, the content at a different resolution than a resolution of the content, the content at different a bit rate than a bit rate of the content, supplemental content to be combined with the content, supplemental content to be integrated with the content, or an advertisement.

14. An apparatus, comprising:
one or more processors; and
a memory storing processor-executable instructions that, when executed by the one or more processors, cause the apparatus to:
receive timing information associated with content provided to a device;
determining, based on the timing information, a first timing attribute and a second timing attribute;
determine, based on a difference between the first timing attribute and the second timing attribute, delivery information;
determine, based on the delivery information, second content; and
send the second content to the device.

15. The apparatus of claim 14, wherein the timing information comprises a time associated with an event that occurs at the device in at least one of:
receiving the content or processing the content.

16. The apparatus of claim 14, wherein the first timing attribute comprises a time associated with initiating a network connection with the device, and the second timing attribute comprises a time associated with completing the network connection with the device.

17. The apparatus of claim 14, wherein the delivery information further comprises a time duration to establish a network connection with a second device sending the content.

18. The apparatus of claim 14, wherein the second content comprises at least one of: an update to the content, the content at a different resolution than a resolution of the content, the content at different a bit rate than a bit rate of the content, supplemental content to be combined with the content, supplemental content to be integrated with the content, or an advertisement.

19. The apparatus of claim 14, wherein the delivery information comprises at least one of: a time duration to send the content, a time duration to establish a network connection, a time duration between a reference event and a user interaction, or a power attribute.

20. The apparatus of claim 14, wherein the delivery information comprises at least one of: a time duration to process the content or a time duration to receive the content.

21. An apparatus, comprising:
one or more processors; and
a memory storing processor-executable instructions that, when executed by the one or more processors, cause the apparatus to:
receive timing information associated with content;
determine, based on the timing information, delivery information comprising a time duration to process the content;
determine, based on the time duration to process the content satisfying a threshold, second content; and
send the second content.

22. The apparatus of claim 21, wherein the timing information comprises a time associated with an event that occurs at a device in at least one of:
receiving the content or processing the content.

23. The apparatus of claim 21, wherein the processor-executable instructions, when executed by the one or more processors, further cause the apparatus to:
determine, based on the timing information, a first timing attribute and a second timing attribute; and
determine the delivery information based on a difference between the first timing attribute and the second timing attribute.

24. The apparatus of claim 23, wherein the first timing attribute comprises a time associated with initiating a network connection with a device, and the second timing attribute comprises a time associated with completing the network connection with the device.

25. The apparatus of claim 21, wherein the processor-executable instructions, when executed by the one or more processors, further cause the apparatus to determine a time duration to establish a network connection with a device sending the content.

26. The apparatus of claim 21, wherein the second content comprises at least one of: an update to the content, the content at a different resolution than a resolution of the content, the content at different a bit rate than a bit rate of the content, supplemental content to be combined with the content, supplemental content to be integrated with the content, or an advertisement.

* * * * *